United States Patent
Crist

(10) Patent No.: US 7,584,685 B2
(45) Date of Patent: Sep. 8, 2009

(54) ACTIVE VIBRATIONAL DAMPER

(75) Inventor: Robert J. Crist, Green County, MO (US)

(73) Assignee: Dayco Products, LLC, Miamisburg, OH (US)

( * ) Notice: Subject to any disclaimer, the term of this patent is extended or adjusted under 35 U.S.C. 154(b) by 743 days.

(21) Appl. No.: 10/969,887

(22) Filed: Oct. 20, 2004

(65) Prior Publication Data

US 2006/0081086 A1 Apr. 20, 2006

(51) Int. Cl.
*F16F 15/30* (2006.01)
(52) U.S. Cl. ..................... 74/574.1
(58) Field of Classification Search ............... 74/572.2, 74/574.1
See application file for complete search history.

(56) References Cited

U.S. PATENT DOCUMENTS

| | | | |
|---|---|---|---|
| 5,582,385 A | 12/1996 | Boyle et al. | |
| 5,829,319 A | 11/1998 | Mokeddem | |
| 5,878,851 A | 3/1999 | Carbon et al. | |
| 6,095,299 A | 8/2000 | Peinemann et al. | |
| 6,196,529 B1 | 3/2001 | Shtankman et al. | |
| 6,335,277 B2 | 1/2002 | Ohto | |
| 6,681,905 B2 * | 1/2004 | Edmondson et al. | 188/267.2 |
| 7,018,102 B1 * | 3/2006 | Brotz | 384/99 |
| 7,086,507 B2 * | 8/2006 | Hitchcock et al. | 188/267.2 |

OTHER PUBLICATIONS

Delphi's Magne-ride Shocks and Struts, Tech Briefs, "Automotive Engineering International", Oct. 2001, pp. 32-33.
J.D. Carlson, D.M. Gatanzarite and K.A. St. Clair, "Commercial Magneto-Rheological Fluid Devices", 1995, Lord Corporation, LL-8001.
Lord Corporation, "Rheonetic Systems A New Dimension in Vibration Control", 1996, PB8003.
C.M., as written in Popular Science and recopied in 1994 by Times Mirror Magazines, Inc., "Magnetic Shocks".
Takao Ushijima and Syoichi Kumakawa, "Active Engine Mount with Piezo-Actuator for Vibration Control", Year Unk., Bridgestone Corporation.

* cited by examiner

*Primary Examiner*—Vicky A Johnson
(74) *Attorney, Agent, or Firm*—Thompson Hine LLP; Joseph V. Tassone

(57) ABSTRACT

A vibration damper and/or isolator for a rotating shaft is provided comprising a hub, an inertia element, a magneto-rheological elastic element interposed between the hub and the inertia element to non-rigidly couple the inertia element to the hub, and an electromagnet operable to produce a magnetic field across the elastic element when energized. The magneto-rheological elastic element, which may comprise a composite of magnetic-responsive particles dispersed within an elastic material, possesses a variable shear modulus that is dependent, at least in part, on the strength of a magnetic field applied to the elastic element.

22 Claims, 6 Drawing Sheets

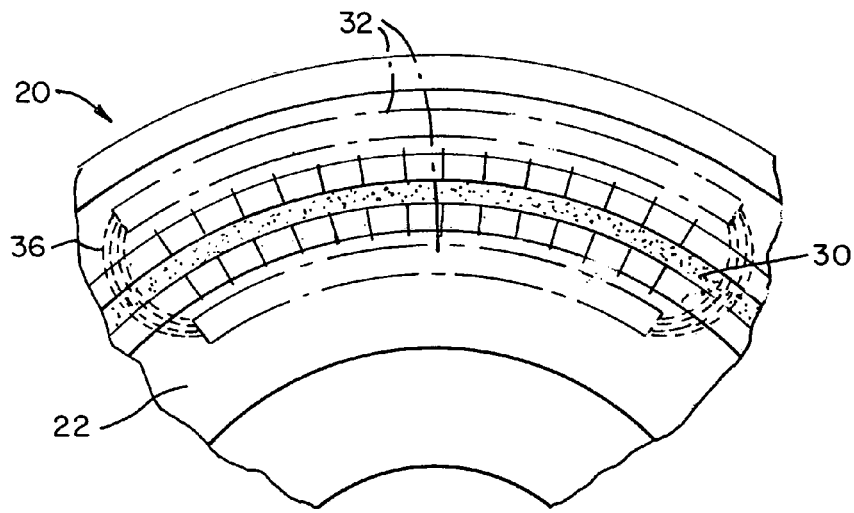
FIG. 4
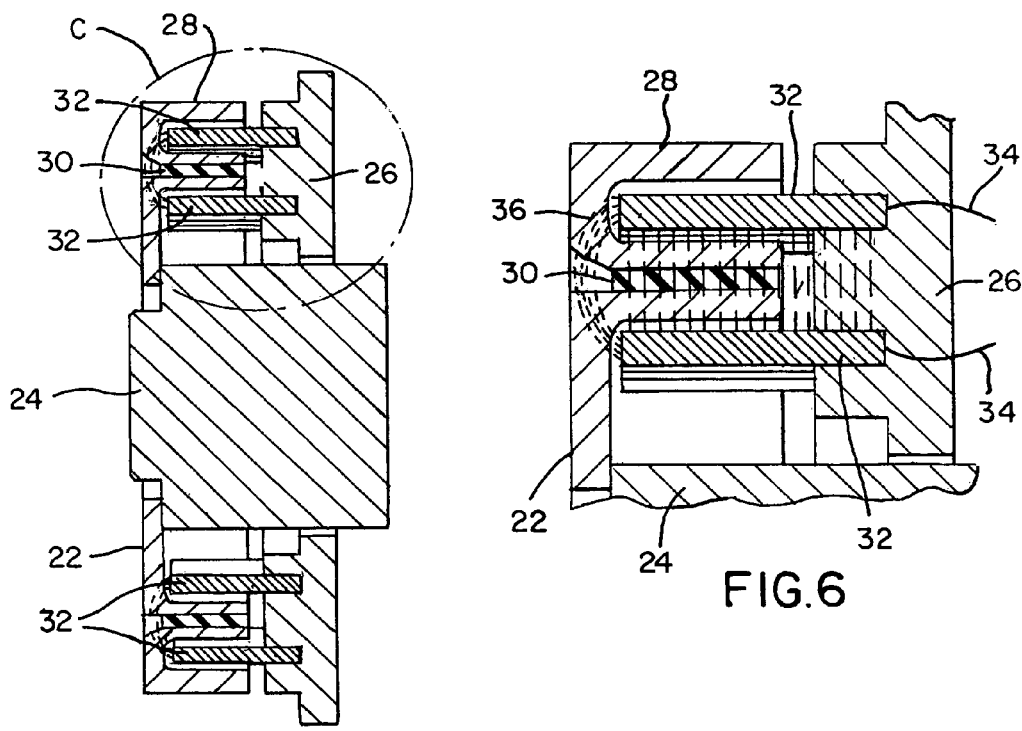
FIG. 5
FIG. 6

ACTIVE VIBRATIONAL DAMPER

TECHNICAL FIELD

The present invention relates generally to vibration dampers, and more particularly, to a controllable vibration damper utilizing a magneto-rheological elastic element.

BACKGROUND

In an automobile, combustion forces produced in the engine cylinders are transferred through the piston-rod connection to the crankshaft to introduce torque pulses that act to spin the crankshaft. It is often the case that this torque-pulse-excitation occurs at a rate (or frequency) that corresponds with the crankshaft's natural torsional first mode, and sometimes second mode, frequency. A crankshaft left to operate in a high amplitude torsional resonance condition is likely to fail much sooner than desirable. Therefore, it is typical to control a crankshaft operating in a resonant condition by adding a specifically designed crankshaft damper.

The two predominant crankshaft damper designs in use today are the fixed frequency elastomeric damper and the broad band viscous damper. The fixed frequency elastomeric damper, which is often used in automotive and light truck applications, utilizes an inertia mass with a torsional spring element to control a specific crank resonance frequency. To target a second resonant torsional frequency a second inertia element and spring element must typically be added resulting in additional cost. With any elastomeric damper, the designer must contend also with lesser but important factors that contribute to frequency shift including temperature changes and permanent frequency shift from elastomer aging.

The broad band viscous damper, which is often used in agricultural, heavy duty and marine applications, utilizes an inertia mass that moves independently in a shear fluid—all of which is contained within a housing mounted to the crank. The shear fluid, often a silicone, provides viscous damping when placed in shear. Thus, the oscillatory input amplitudes of the crank are met with a counteracting torque of the fluid in shear. Though a viscous damper is often less effective than a fixed tuned damper at its specifically tuned frequency, the viscous damper is able to durably counteract high torsional amplitudes across multiple frequencies.

Given the benefits of both designs, the elastomeric and viscous type dampers have been combined into a single design configuration, as shown in FIG. 1, in the rare situation where the cost/benefit ratio is satisfactory. The combination of both designs, however, may result in wasted mass and excessive damping that drain the engine's fuel economy and torque responsiveness away from it's primary function as a power source. Accordingly, more often than not, a damper designer must trade the benefits of one design for the benefits of the other.

One example of a prior art combination damper is shown in FIG. 1. The combination damper 10 includes a plate 12, which is mounted to the crank-nose of a crankshaft, an inertia ring 14 and a pair of rubber elements 16 that couple the inertia ring 14 to the plate 12. A chamber 18 formed between the plate 12, the inertia ring 14 and the rubber elements 16 contains a viscous fluid to provide viscous damping.

With the advent of magneto-rheological fluids ("MR fluids") and new magneto-rheological composite materials ("MR composites") (collectively "MR materials"), it is now possible to actively control a vibration damper to overcome the shortcomings of the prior art. In particular, through the application of a magnetic field the material properties of a damper can be actively manipulated to control the damping and/or targeted frequency of the damper.

Accordingly, a new damper is desired that utilizes MR materials to provide for active control of vibrations. One embodiment of the new active vibration damper, detailed herein, is particularly well suited to control torsional vibrations in, for example, a crankshaft. Other embodiments, however, could be used for bending dampers or axial dampers.

SUMMARY

According to a first aspect, a vibration damper is provided comprising an inertia element, a magneto-rheological elastic element and an electromagnet. The elastic element is interposed between the inertia element and an associated vibrating element to non-rigidly couple the inertia element to the vibrating element. The electromagnet is operable to produce a magnetic field across the elastic element when energized. The magneto-rheological elastic element may comprise a composite of magnetic-responsive particles dispersed within an elastic material so that the elastic element possesses a variable modulus that is dependent, at least in part, on the strength of a magnetic field applied to the elastic element.

The vibration damper may further comprise a vibration sensor and a controller that is operatively coupled to the vibration sensor for receiving a signal therefrom. The controller is operable to energize the electromagnet based, at least in part, on the signal received from the sensor.

Additionally, the vibration damper may include a fluid chamber formed between the inertia element the associated vibrating element that contains a viscous fluid to provide viscous damping. If the viscous fluid is a magneto-rheological fluid, the electromagnet may further be operable to produce a magnetic field across the fluid chamber when energized so as to provide variable viscous damping.

According to a second aspect, a torsional vibration damper is provided comprising a hub, an inertia element, a magneto-rheological elastic element and an electromagnet. The hub is adapted to be coupled to an associated rotating shaft and the elastic element is interposed between the hub and the inertia element to non-rigidly couple the inertia element to the hub. The electromagnet is operable to produce a magnetic field across the elastic element when energized. The elastic element may comprise a composite of magnetic-responsive particles dispersed within an elastic material such that the elastic element possesses a variable modulus that is dependent, at least in part, on the strength of a magnetic field applied to the elastic element.

According to a third aspect, a method of controlling vibrations in a vibrating element is provided. The steps of the method include coupling the vibrating element to a vibration damper having a magneto-rheological elastic element and an inertia element, wherein the frequency of the vibration damper is dependent, at least in part, on the shear modulus of the elastic element. The method further includes the steps of monitoring the vibrations of the vibrating element and applying a magnetic field to the magneto-rheological elastic element of the damper based, at least in part, on the monitored vibrations of the vibrating element. In this manner, the shear modulus of the elastic element, and therefore the frequency of the damper, can be controlled.

According to a fourth aspect, a method of directly controlling the torsional vibrations of a rotating shaft is provided. The steps of the method include providing a vibration damper having a magneto-rheological elastic element interposed between an inertia element and a hub, wherein the frequency of the vibration damper is dependent, at least in part, on the shear modulus of the elastic element, and coupling the hub of the vibration damper to a rotating shaft. The method further includes the steps of monitoring the vibrations of the rotating shaft and applying a magnetic field to the elastic element of the damper based, at least in part, on the monitored vibrations of the rotating shaft to control the shear modulus of the elastic element and therefore the frequency of the damper.

According to a fifth aspect, a method of indirectly controlling the torsional vibrations of a rotating shaft in an engine system is provided. The steps of the method include providing a vibration damper having a magneto-rheological elastic element interposed between an inertia element and a hub, wherein the frequency of the vibration damper is dependent, at least in part, on the shear modulus of the elastic element, and coupling the hub of the vibration damper to a rotating shaft in an engine system. The method further includes the steps of monitoring the operating conditions of the engine system and applying a magnetic field to the elastic element of the damper based, at least in part, on the monitored operating conditions of the engine system to control the shear modulus of the elastic element and therefore the frequency of the damper.

According to a sixth aspect, a method of isolating an associated element from the vibrations of a vibrating element is provided. The method includes the preparatory steps of providing a vibration damper having a magneto-rheological elastic element, wherein the frequency of the vibration damper is dependent, at least in part, on the shear modulus of the elastic element, and interposing the vibration damper between a vibrating element and an associated element to couple the associated element to the vibrating element. Additionally, the method includes the steps of monitoring the vibrations of the associated element and applying a magnetic field to the magneto-rheological elastic element of the damper based, at least in part, on the monitored vibrations of the associated element to control the shear modulus of the elastic element and therefore the frequency of the damper.

According to a seventh aspect, another method of isolating an associated element from the vibrations of a vibrating element is provided. The method includes the preparatory steps of providing a vibration damper having a magneto-rheological elastic element, wherein the damping value of the vibration damper is dependent, at least in part, on the damping characteristics of the elastic element, and interposing the vibration damper between a vibrating element and an associated element to couple the associated element to the vibrating element. The method further includes the steps of monitoring the vibrations of the associated element and applying a magnetic field to the magneto-rheological elastic element of the damper based, at least in part, on the monitored vibrations of the associated element to control the damping characteristics of the elastic element and therefore the damping value of the damper.

BRIEF DESCRIPTION OF THE DRAWINGS

FIG. 4 is a detailed view of Section B of FIG. 3;

FIG. 5 is a cross-sectional view of the vibration damper of FIG. 2 installed on a crank-nose;

FIG. 6 is a detailed view of Section C of FIG. 5;

DETAILED DESCRIPTION

Figure 1:
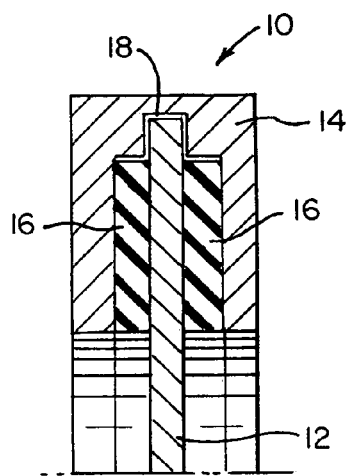
FIG. 1 is a partial cross-section of a prior art torsional damper for a rotating shaft.
Figure 2:
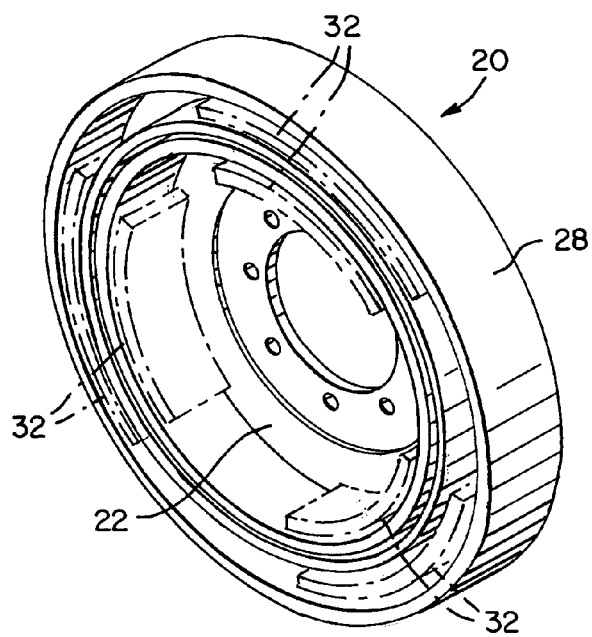
FIG. 2 is an isometric view of a vibration damper according to a one aspect indicating the position of associated electromagnets in phantom lines.
Figure 3:
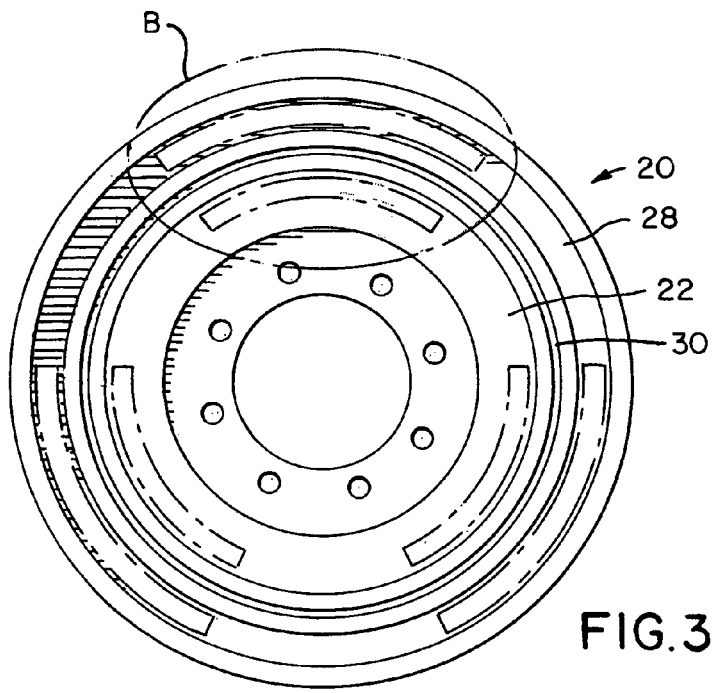
FIG. 3 is a rear view of the vibration damper of FIG. 2 indicating the position of associated electromagnets in phantom lines.

A new active vibration damper utilizing one or more magneto-rheological materials is shown in FIGS. 2-6. Although the particular embodiments that are depicted are effective in controlling the torsional vibrations of a crankshaft, the broad concept of active vibration dampers disclosed herein has broader application. In addition to the embodiments described herein, the varied damping and varied spring rate technology that is disclosed would be useful in other applications including, for example, linear dampers and bending dampers. Furthermore, as used herein, the term "vibration damper" includes not only devices that counteract, control or reduce the vibrations of a vibrating element but also devices such as isolators that insulate or protect elements that are associated with a vibrating element.

Referring to FIGS. 2-6, in one embodiment the vibration damper 20 includes a hub 22 that may be coupled to a rotating shaft, such as a crankshaft, for rotational movement therewith. Specifically, the hub 22 may be coupled to the crank-nose 24 of a crankshaft, which typically protrudes from the front cover 26 of an engine or generator, as in FIG. 5. The hub 22 may be made from metal, plastic, or any other suitable rigid or semi-rigid material and may be coupled to the rotating shaft by any typical means including set screws, keyways or interference fits.

The vibration damper 20 further includes an inertia element 28, which may be an annular ring concentric with and spaced radially outwardly from the hub 22. In other embodiments the inertia element may be spaced radially inwardly from a flange on the hub or spaced axially from such a flange. The inertia element 28 may be made from metal, plastic or any material having suitable mass. The outer surface of the inertia element may include one or more grooves or notches to receive a power transmitting belt. The belt may be further engaged with one or more driven sheaves operatively engaged with one or more accessories, such as an integrated starter generator unit or a compressor. Alternatively, if the inertia element is located radially inwardly from a flange on the hub, the outer surface of the hub may include one or more grooves to receive a power transmitting belt.

Interposed between the hub 22 and the inertia element 28 is a magneto-rheological elastic element 30 that non-rigidly couples the inertia element 28 to the hub 22. In particular, the elastic element 30 may be press fit or injection molded between the inertia element 28 and the hub 22 or adhered to the inertia element 28 and the hub 22 using any conventional adhesive that is typically used in the field. The vibrations of the crank-nose 24 are transferred to the inertia element 28 through the magneto-rheological elastic element 30, which has some spring rate that is governed, at least in part, by the shear modulus of the elastic element 30.

As is well known in the art, the elastic element 30 may be designed such that the damper provides either counteractive damping of a vibrating element or through vibration isolation at a particular vibration frequency. For example, the spring rate of the elastic element may be selected such that the vibrations of the inertia element 28, after having been transferred through the elastic element, occur out of phase with the vibrations of the crank-nose 24 to provide a counteracting torque that controls resonant vibrations of the crank-nose 24. Alternatively, when used as an isolator, the spring rate of the elastic element may be selected such that the inertia element 28 and other associated elements experience substantially lower vibration amplitudes than the crank-nose 24 at a particular crank-nose vibration frequency. The "frequency of the damper," as that term is used herein, refers to the targeted frequency at which the damper is design to either produce a peak counteracting torque or provide maximum isolation.

The new magneto-rheological elastic element 30 of the present invention comprises a composite of magnetic-responsive particles dispersed within an elastic material, which may be, for example, a rubber with an Ethylene Acrylic base such as VAMAC™ rubber. In one embodiment the elastic element 30 comprises magnetic-responsive particles in the range of 10% to 50% by volume.

As used herein the term "magnetic-responsive particles" means broadly particles that are either significantly attracted or repelled by a magnetic field including, for example, ferromagnetic particles like iron, nickel or cobalt, and diamagnetic particles like bismuth or antimony. As a result of magnetic forces generated by the interaction of an applied magnetic field with the magnetic-responsive particles dispersed within the composite, the elastic element 30 possesses variable elastic moduli, including shear modulus, that can be controlled through control of the magnetic field. This phenomenon is substantially related to the well known variable viscosity of magneto-rheological fluids and is confirmed by experimental test results. In addition, it is further anticipated that the damping characteristics of the elastic element 30 can also be controlled through the application of a magnetic field.

Figure 8:
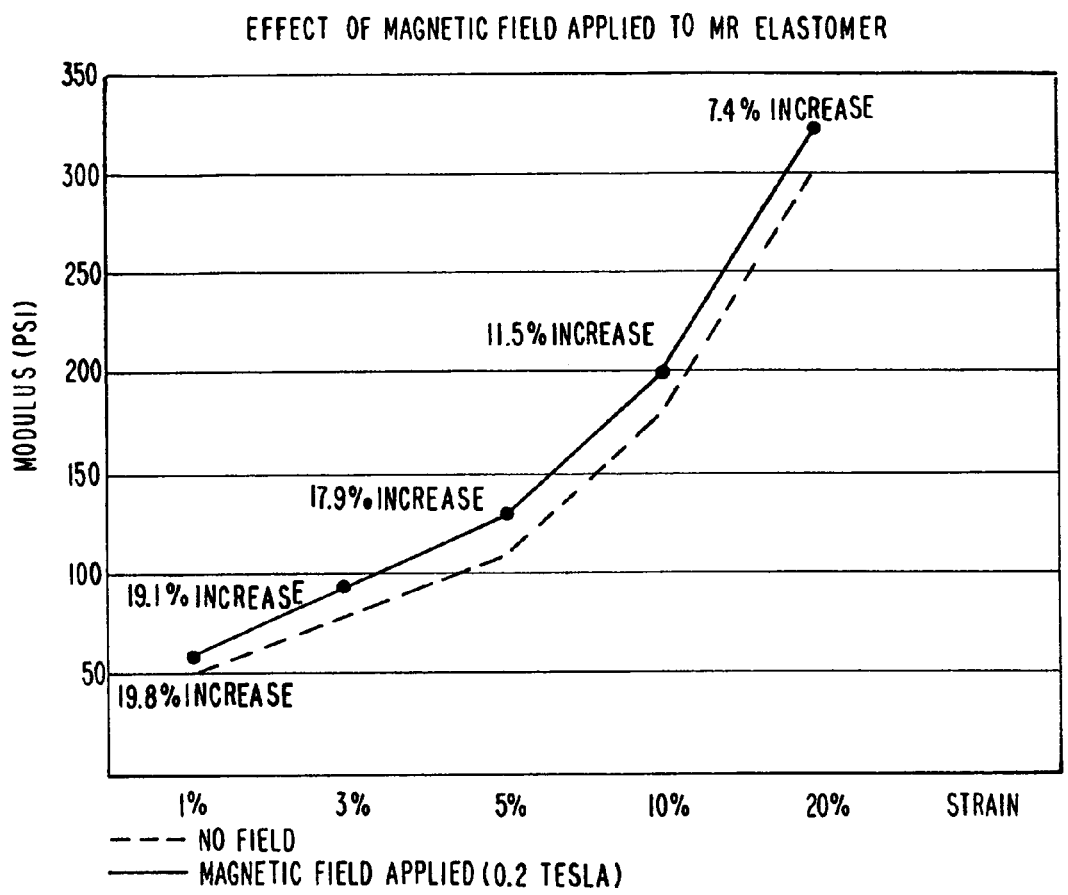
FIG. 8 is a graph showing the effect of a magnetic field on the elastic modulus of one possible magneto-rheological elastic element.

Referring to FIG. 8, a composite of VAMAC™ rubber containing 25 parts per hundred rubber by volume of 60 micron iron particles was loaded in tension both within and outside the presence of a magnetic field. When a magnetic field strength of 0.2 Tesla was applied, an elastic modulus increase of between approximately 7% and 20% was measured, dependant upon the strain levels. The shear modulus or modulus of rigidity, G, of a material is related to the elastic modulus, E, of the material by the equation: $G=E/(2(1+v))$ where v is Poisson's Ratio for the material.

Referring again to the embodiment shown in FIGS. 2-6, a plurality of electromagnets 32 (shown in phantom lines in FIGS. 2-4) are mounted on the front cover 26 of the engine and are positioned so as to be located in close proximity to the elastic element 30 as it rotates. When energized through wire leads 34 operatively coupled to a controller (shown in FIGS. 9 and 10), the electromagnets 32 are operable to produce a magnetic field 36 across the elastic element 30. Of course the number and position of the electromagnets may be varied. By varying the voltage applied to the electromagnets the strength of the magnetic field 36 can be controlled to in turn control the shear modulus and therefore the spring rate of the elastic element 30.

Figure 7A:
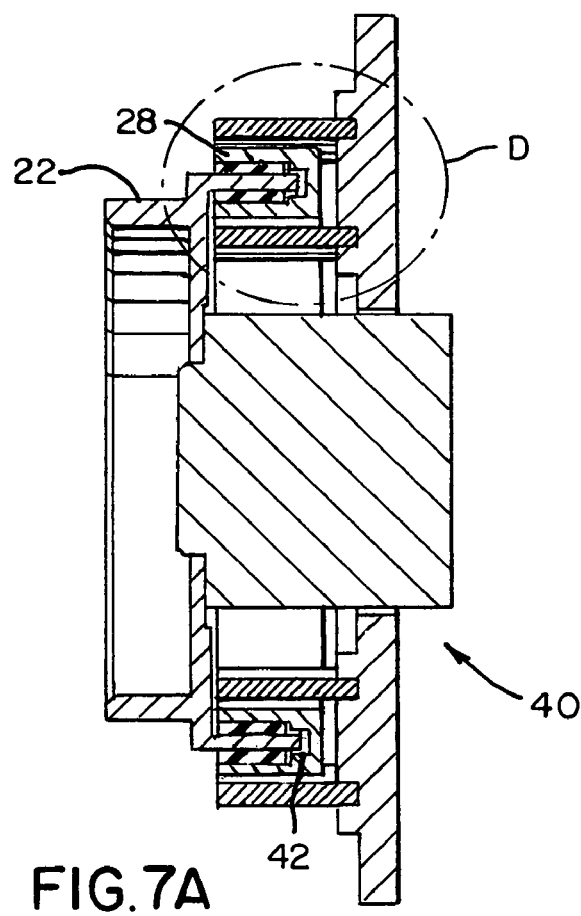
FIG. 7A is a cross-sectional view a vibration damper according to a second aspect.
Figure 7B:
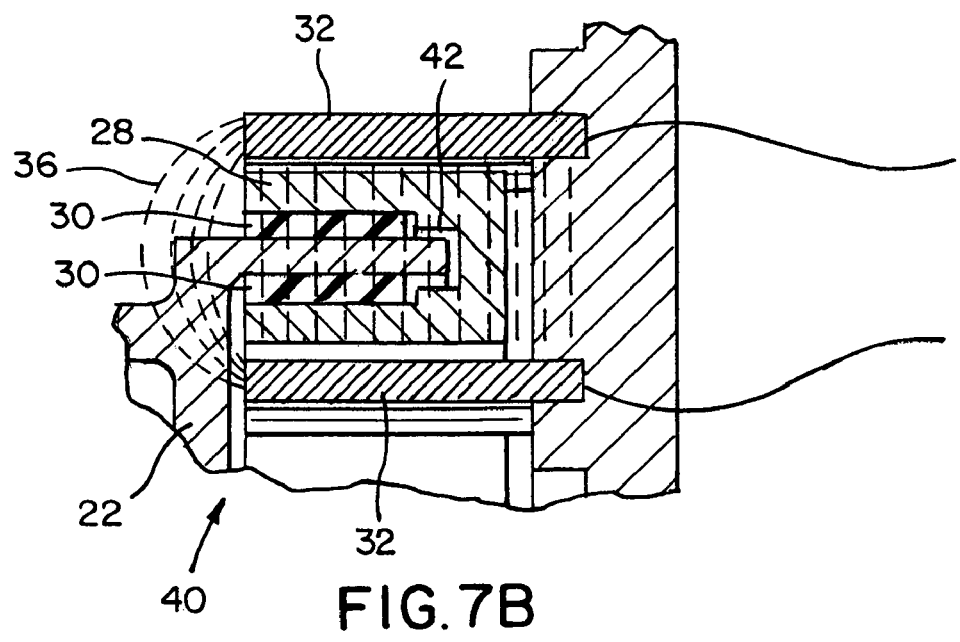
FIG. 7B is a detailed view of Section D of FIG. 7A.

Referring now to FIGS. 7A and 7B (collectively "FIG. 7"), a new active vibration damper 40 according to a second embodiment is depicted. To the extent that the vibration damper shown in FIG. 7 utilizes structural elements similar to the elements previously described with respect to FIGS. 2-6, identical reference numerals have been used to identify the elements. In addition to those elements, however, the embodiment shown in FIG. 7 further includes a fluid chamber 42 formed between the hub 22 and the inertia element 28. The fluid chamber 42 contains a viscous fluid, which may be a magneto-rheological fluid, to provide viscous damping as the inertia element 28 moves relative to the hub 22. If a magneto-rheological fluid is used, the fluid chamber 42 should be located so as to be within the magnetic field produced by the electromagnets 32 when energized. In this embodiment the elastomeric spring rate and the viscous damping rate of the damper can be actively controlled through control of the magnetic field strength.

In view of the new vibration damper disclosed herein, several new control systems and methods for controlling and/or isolating vibrations are possible. For example, referring to FIG. 9, a schematic of a system for directly controlling the vibrations of a rotating shaft is shown. FIG. 10, by contrast, shows a system for indirectly controlling the vibrations of a rotating shaft.

Figure 9:
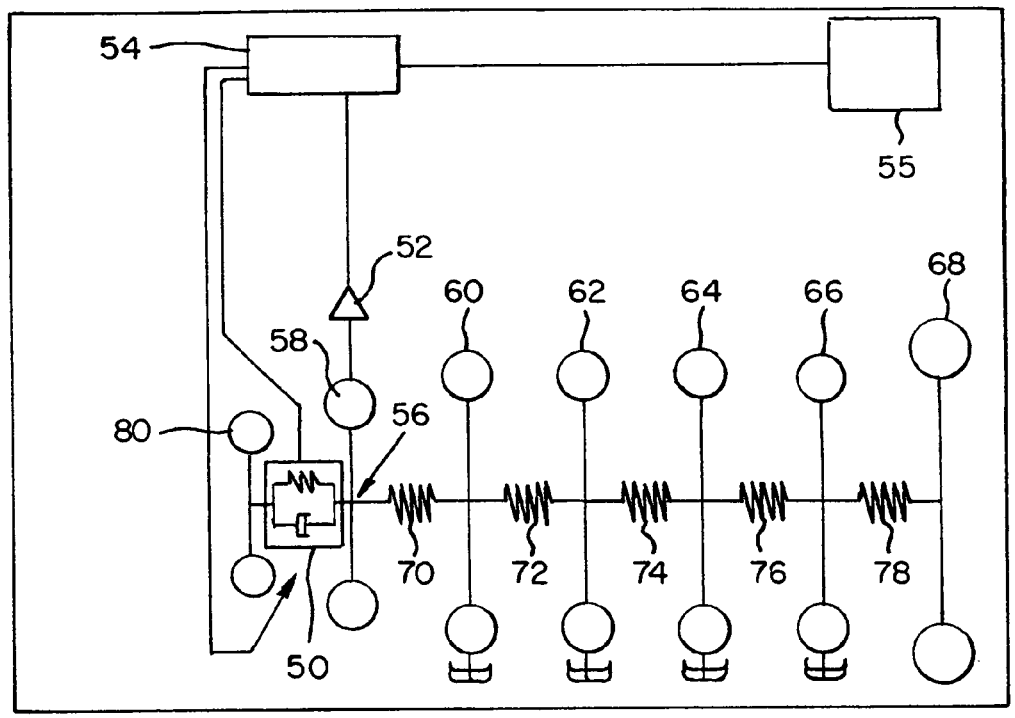
FIG. 9 is a schematic depicting a system for directly controlling the torsional vibrations of a rotating shaft.
Figure 10:
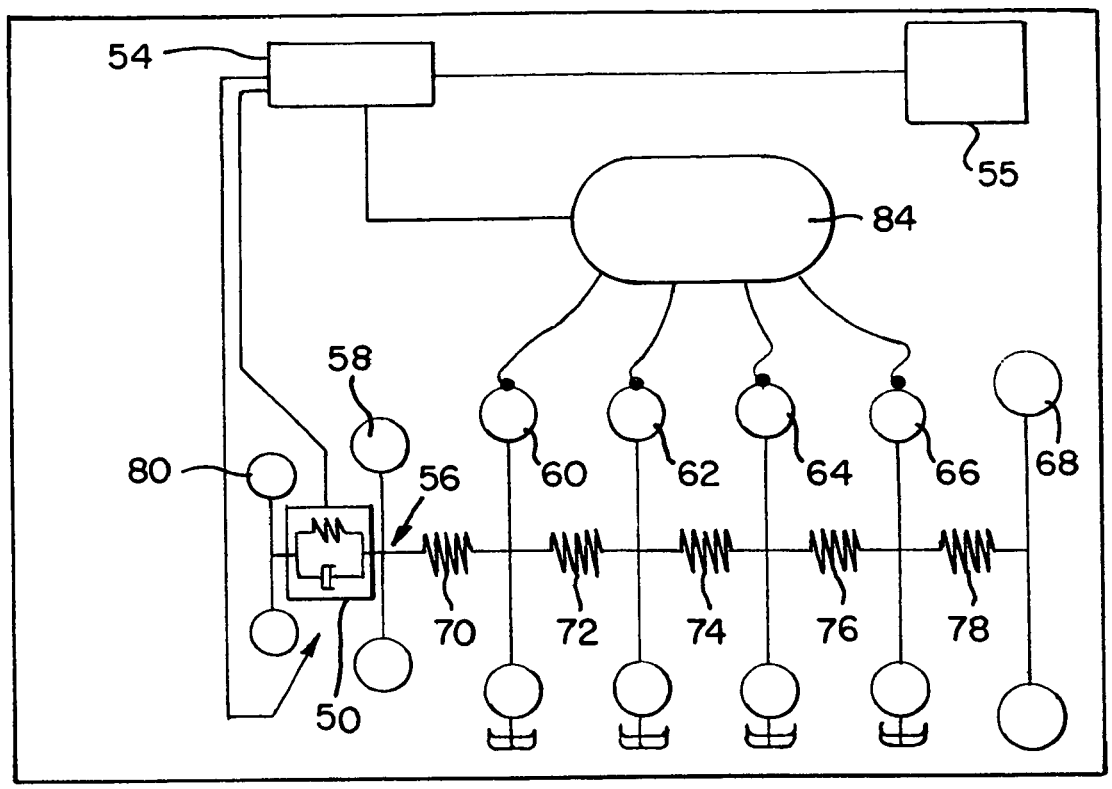
FIG. 10 is a schematic depicting a system for indirectly controlling the torsional vibrations of a rotating shaft.

Referring to FIG. 9, a system for directly controlling the vibrations of a rotating shaft is shown having an active vibration damper 50 like the one disclosed herein, a vibration sensor 52 and a controller 54. The system may further include a power source 55. The rotating shaft 56, which may be the crankshaft of an automobile, is represented as a series of rotating elements 58, 60, 62, 64, 66, 68, each having some rotational inertia, connected by torsional spring elements 70, 72, 74, 76, 78, where the rotating shaft itself has some torsional spring rate. The active vibration damper 50 couples the end of the rotating shaft 58, which may be the crank-nose in conjunction with the damper/isolator hub, to another rotating element 80, which may be a damper inertia ring and/or an isolator pulley and/or a belt drive system. The vibration sensor 52, which may be a displacement sensor, monitors the vibrations of the end of the rotating shaft 58. The controller 54 is operatively coupled to the vibration sensor 52 for receiving a signal therefrom and is operable to energize an electromagnet to control the material properties of the active vibration damper 50 based, at least in part, on the signal received from the sensor 52. The active vibration damper 50, as previously described, includes an elastic element having at least a controllable spring rate and it is believed controllable elastomeric damping properties. In some embodiments having a fluid chamber the vibration damper 50 may also possesses controllable fluid damping properties. Accordingly, the frequency and damping range over which the damper can provide effective vibration control is increased.

Referring to FIG. 10, a system for indirectly controlling the vibrations of a rotating shaft is shown having an active vibration damper 50, a controller 54 and one or more performance sensors 84. If the rotating shaft is, for example, a crankshaft, the performance sensors 84 may monitor engine and combustion performance to indirectly determine the vibration damping that is necessary. The controller 54 is operatively coupled to the performance sensors 84 for receiving a signal therefrom and is operable to energize an electromagnet to control the material properties of the active vibration damper 50 based, at least in part, on the signal received from the sensors 84.

In addition to controlling the vibrations of a vibrating element, the active vibration damper disclosed herein may also be used to isolate vibrations. As used herein, the concept of "isolating" an element from vibrations means to reduce or eliminate the transfer of vibrations to the element. This may be accomplished either by controlling the damping or the spring rate of the vibration damper for a given vibration frequency. As used herein, the broad concept of "damping" includes the reduction of energy transfer by, for example, conversion of kinetic energy into heat. It is believed that the damping properties of a magneto-rheological elastic element, like its spring rate, can be controlled or varied through the application of a magnetic field. Accordingly, the systems and devices already described are effective with little or no modification as isolators.

The benefits and advantages of the new active vibration dampers will be apparent to those skilled in the art and include real-time control to accommodate both normal and abnormal engine operating conditions as well as improved cost and mass efficiency through the elimination of dual spring/dual inertia damper designs. Because the elastic and/or viscous material properties of the active vibration damper can be altered, multiple frequencies, modes, temperature changes and elastomer aging can be accommodated without the added mass and cost of more traditional combination type dampers. Additionally, it may be possible to reduce noise emission when the damper is part of the noise transmission path and improve the life of the damper through the reduction of stress, strain and heat generation in the damper.

What is claimed is:

1. A vibration damper comprising:
    a vibrating element coupled to a rotating shaft for rotational movement therewith;
    an annular inertia element having an axially extending slot in an outer face thereof;
    a magneto-rheological elastic element interposed between the inertia element and the vibrating element; and
    an electromagnet operable to produce a magnetic field across the elastic element when energized;
    wherein the inertia element is elastically coupled to the vibrating element by the magneto-rheological elastic element; and
    wherein at least one of a portion of the electromagnet, a portion of the magneto-rheological elastic element, or a portion of the vibrating element is located within the slot in the annular inertia element.

2. A vibration damper as claimed in claim 1, wherein the magneto-rheological elastic element comprises a composite of magnetic-responsive particles dispersed within an elastic material.

3. A vibration damper as claimed in claim 2, wherein the magneto-rheological elastic element comprises magnetic-responsive particles in the range of 10 % to 50 % by volume.

4. A vibration damper as claimed in claim 1, wherein the magneto-rheological elastic element possesses a variable elastic modulus that is dependent, at least in part, on the strength of a magnetic field applied to the elastic element.

5. A vibration damper as claimed in claim 1, wherein the magneto-rheological elastic element possesses a variable shear modulus that is dependent, at least in part, on the strength of a magnetic field applied to the elastic element.

6. A vibration damper as claimed in claim 1, further comprising:
    a vibration sensor; and
    a controller operatively coupled to the vibration sensor for receiving a signal therefrom, wherein the controller is operable to energize the electromagnet based, at least in part, on the signal received from the sensor.

7. A vibration damper as claimed in claim 1, further comprising:
    a fluid chamber formed between the inertia element and the associated vibrating element, wherein the chamber contains a viscous fluid to provide viscous damping when the inertia element moves relative to the associated vibrating element.

8. A vibration damper as claimed in claim 7, wherein the viscous fluid is an magneto-rheological fluid and wherein the electromagnet is operable to produce a magnetic field across the fluid when energized.

9. A vibration damper as claimed in claim 1, further comprising:
    a fluid chamber defined by the slot of the inertia element, the vibrating element, and the magneto-rheological elastic element, wherein the fluid chamber contains a viscous fluid to provide viscous damping.

10. A vibration damper as claimed in claim 9, wherein the viscous fluid is a magneto-rheological fluid and the electromagnet is operable to produce a magnetic field across the magneto-rheological fluid.

11. A vibration damper as claimed in claim 1, wherein the electromagnet is fixedly mounted and the vibrating element and magneto-rheological elastic element rotate relative to the electromagnet.

12. A vibration damper comprising:
    a hub adapted to be coupled to an associated rotating shaft for rotational movement therewith;
    an inertia element having a an axially extending slot in an outer face thereof;
    a magneto-rheological elastic element interposed between the hub and the inertia element to non-rigidly couple the inertia element to the hub for rotation therewith;
    a fluid chamber defined by the slot in the inertia element, the hub, and the magneto-rheological elastic element, the fluid chamber containing a magneto-rheological fluid; and
    an electromagnet operable to produce a magnetic field across the magneto-rheological elastic element and the magneto-rheological fluid.

13. A vibration damper as claimed in claim 12, wherein the magneto-rheological elastic element comprises a composite of magnetic-responsive particles dispersed within an elastic material.

14. A vibration damper as claimed in claim 13, wherein the magneto-rheological elastic element comprises magnetic-responsive particles in the range of 10 to 50 % by volume.

15. A vibration damper as claimed in claim 14, wherein the elastic material of the elastic element comprises either natural or synthetic rubber.

16. A vibration damper as claimed in claim 12, wherein the magneto-rheological elastic element possesses a variable elastic modulus that is dependent, at least in part, on the strength of a magnetic field applied to the elastic element.

17. A vibration damper as claimed in claim 12, wherein the magneto-rheological elastic element possesses a variable shear modulus that is dependent, at least in part, on the strength of a magnetic field applied to the elastic element.

18. A vibration damper as claimed in claim 12, further comprising:
    a vibration sensor; and
    a controller operatively coupled to the vibration sensor for receiving a signal therefrom, wherein the controller is operable to energize the electromagnet based, at least in part, on the signal received from the sensor.

19. A vibration damper as claimed in claim 12, further comprising:
    a fluid chamber formed between the inertia element and the hub, wherein the chamber contains a viscous fluid to provide viscous damping when the inertia element moves relative to the hub.

20. A vibration damper as claimed in claim 19, wherein the viscous fluid is an magneto-rheological fluid and wherein the electromagnet is operable to produce a magnetic field across the fluid when energized.

21. A vibration damper as claimed in claim 12, wherein at least one of a portion of the electromagnet, a portion of the magneto-rheological elastic element, or a portion of the vibrating element is located within the slot in the inertia element.

22. A vibration damper as claimed in claim 12, wherein the electromagnet is fixedly mounted and the hub rotates relative to the electromagnet.

* * * * *